(12) United States Patent
Mawson et al.

(10) Patent No.: US 9,648,565 B1
(45) Date of Patent: May 9, 2017

(54) SAFETY CUTOFF FOR A POWER TOOL OR OTHER DEVICE

(71) Applicant: Cutting Edge Innovations, LLC, Garnet Valley, PA (US)

(72) Inventors: William Mawson, Glen Mills, PA (US); Stephen V. Weigman, Garnet Valley, PA (US)

(73) Assignee: CUTTING EDGE INNOVATIONS, LLC, Garnet Valley, PA (US)

( * ) Notice: Subject to any disclaimer, the term of this patent is extended or adjusted under 35 U.S.C. 154(b) by 0 days.

(21) Appl. No.: 15/248,371

(22) Filed: Aug. 26, 2016

Related U.S. Application Data

(60) Provisional application No. 62/330,918, filed on May 3, 2016.

(51) Int. Cl.
*G08B 21/00* (2006.01)
*H04W 52/02* (2009.01)
*G08B 21/18* (2006.01)

(52) U.S. Cl.
CPC ........ *H04W 52/0241* (2013.01); *G08B 21/18* (2013.01); *H04W 52/0229* (2013.01)

(58) Field of Classification Search
CPC ......... H04W 52/0241; H04W 52/0229; H04W 12/08; H04W 88/04; G08B 21/18; G08B 13/1409; G08B 21/16; G08B 13/1427; G08B 15/004; G08B 21/0213; G08B 21/0261; G08B 21/0275; H04L 63/10; H01R 43/22; B25F 5/00; G08C 2201/93

USPC ... 340/539.15, 539.23, 571, 687, 680, 686.6
See application file for complete search history.

(56) References Cited

U.S. PATENT DOCUMENTS

| | | | |
|---|---|---|---|
| 4,057,805 A | 11/1977 | Dowling | |
| 6,118,380 A * | 9/2000 | Gannon | G08B 21/023 340/571 |
| 6,380,852 B1 * | 4/2002 | Hartman | H04B 15/02 307/116 |
| 7,253,541 B2 | 8/2007 | Kovarik et al. | |
| 2007/0262862 A1* | 11/2007 | Barrett | G08B 13/1427 340/539.15 |
| 2009/0273436 A1* | 11/2009 | Gluck | H04L 63/10 340/5.2 |
| 2011/0248653 A1* | 10/2011 | Brotto | B25F 5/021 318/139 |
| 2015/0084768 A1* | 3/2015 | Brooks | F16P 3/147 340/539.11 |
| 2016/0005295 A1* | 1/2016 | Ikeda | G08B 21/18 340/539.1 |

* cited by examiner

*Primary Examiner* — Anh V La
(74) *Attorney, Agent, or Firm* — Panitch Schwarze Belisario & Nadel LLP

(57) ABSTRACT

A cutoff system for a power tool or other device includes a receiver and a transmitter, the receiver being configured to electrically couple to a power source and to a power tool or other device, the transmitter is configured to transmit a communication signal to the receiver, and the receiver is further configured to transmit electrical power from the power source to the power tool or other device only when the receiver receives the communication signal from the transmitter.

8 Claims, 3 Drawing Sheets

US 9,648,565 B1

SAFETY CUTOFF FOR A POWER TOOL OR OTHER DEVICE

CROSS-REFERENCE TO RELATED APPLICATIONS

The present applications claims the benefit of U.S. Provisional Patent Application No. 62/330,918, filed on May 3, 2016 and titled "SAFETY CUTOFF FOR A POWER TOOL OR OTHER DEVICE," the entire contents of which are incorporate herein by reference in their entirety.

BACKGROUND OF THE INVENTION

The present application relates to an automatic cutoff device for disabling electrical current to a power tool or other device when the operator is not within a certain proximity of the tool or other device.

Power tools, such as drills, saws, sanders, and the like, are generally known. Such tools are generally electrically powered, either through a corded connection to a wall outlet or with a battery connected to the tool for added portability. Electric power presents great benefits to an operator in terms of the added energy the tool can be capable of exerting compared to manual power, such as additional torque for a drill or faster movement of an electric sander, which allows an operator to perform tasks that may not be capable of performance through hand-powered tools or may allow an operator to perform tasks faster or with less exertion than with hand-powered tools.

However, traditional power tools are powered at all times when plugged in or connected to a charged battery. The energy capable of exertion by power tools can therefore be dangerous if a tools is unintentionally activated by a passerby, a child, or by the operator when his or her attention is directed elsewhere. Therefore, a need exists for an automatic cutoff device that disables power to the power tool when the operator is not within the proximity of the tool to prevent accidental activation of the tool.

BRIEF SUMMARY OF THE INVENTION

A cutoff system for a power tool or other device includes a receiver and a transmitter, wherein the receiver is configured to electrically couple to a power source and to a power tool or other device, the transmitter is configured to transmit a communication signal to the receiver, and the receiver is further configured to transmit electrical power from the power source to the power tool or other device only when the receiver receives the communication signal from the transmitter.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
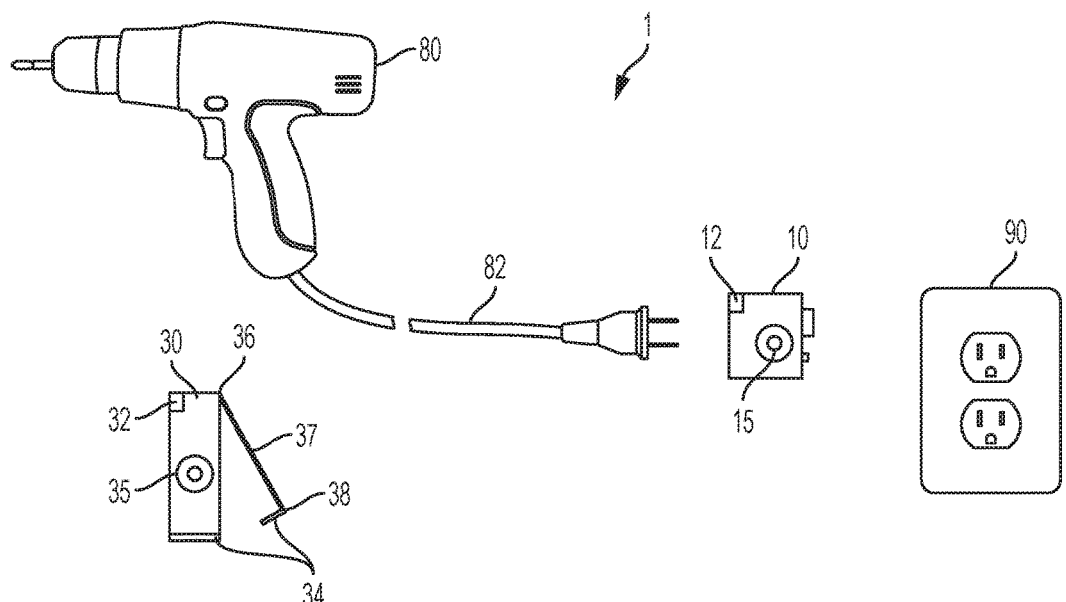
FIG. 1 is a front perspective view of a safety cutoff device for a power tool including a receiver, a power tool, an electrical outlet, and a transmitter in an open configuration in accordance with a first preferred embodiment of the invention.

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of the device and instruments and related parts thereof. The terminology includes the above-listed words, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 2:
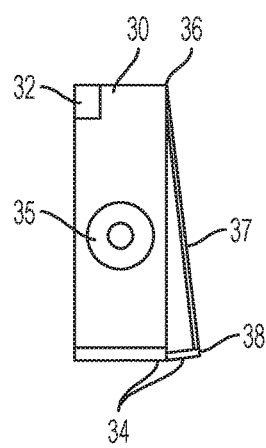
FIG. 2 is a side elevational view of the transmitter of FIG. 1, shown in a closed configuration.

Referring to FIGS. 1-2, a first preferred embodiment of a safety cutoff system 1 is shown. The cutoff system 1 includes a receiver 10 and a transmitter 30. To demonstrate the cutoff system in use, FIG. 1 also shows a power tool 80 and an electrical outlet 90. One side of the receiver 10 is preferably configured to plug into and draw power from any common source of electrical power, such as a three-pronged wall outlet 90, an extension cord (not shown), and the like. The opposing side of the receiver 10 is preferably configured to receive and provide power to the end of the cord 82 of the power tool 80, the power being drawn from the electrical outlet 90 and passed through the receiver 10 preferably with minimal loss.

The receiver 10 is in communication with a transmitter 30. Such communication is preferably via the Bluetooth® protocol, but may be any format suitable for short-range wireless communication. The transmitter 30 is configured to generally continuously or periodically send a communication signal to the receiver 10. The receiver 10 is in turn configured to only provide power to the power tool 80 when it is receiving the communication signal from the transmitter 30. If the receiver 10 detects no signal from the transmitter 30 for a predetermined minimal time, such as if the transmitter 30 is moved to a distance beyond the maximum range from which it can communicate with the receiver 10 (preferably approximately ten meters), the receiver 10 shuts off power to the power tool 80 until the receiver 10 again detects the signal from the transmitter 30. The transmitter 30 is powered by any suitable portable powering means, such as by one or more AA batteries. In an alternative embodiment, the transmitter 30 may be configured as an application on a user's smart phone or similar device.

The transmitter 30 is preferably configured to include an arm 37 attached to the transmitter 30 by a hinge 36. The hinge 36 is preferably spring loaded such that the hinge 36 maintains the arm 37 generally proximate to the transmitter 30 (as shown in FIG. 2) unless a user pulls the arm 37 away from the transmitter 30 (as shown in FIG. 1). The arm 37 is preferably configured such that it can be mounted on a user's belt, pocket, or other item of clothing with the spring loaded nature of the hinge 36 providing sufficient force to retain the arm 37 against the user's belt, pocket, or other item of clothing. In use, the ability to attach the transmitter 30 to a user's clothing provides for the power to be cut off from the power tool 80 if the user moves away from the receiver 10, disrupting communication between the transmitter 30 and receiver 10.

The transmitter 30 further preferably includes at least two electrical contacts 34. One contact 34 is preferably located at a distal end 38 of the arm 37 and the other contact 34 is preferably located on the body of the transmitter 30. The transmitter 30 is preferably configured such that it does not transmit a communication signal to the receiver 10 if the contacts 34 are in engagement with one another. In use, the contacts 34 provide for the function that the transmitter 30 does not transmit a signal, and therefore the receiver 10 does not provide power to the power tool 80, unless the user retracts the arm 37 and preferably mounts the transmitter 30 to an article of his or her clothing. If, during use, the transmitter 30 is dislodged from the operator's belt or clothing, the contacts 34 reengage with one another to prevent the communication signal from being sent by the transmitter 30 and power is cut off to the power tool 80. Left alone, the contacts 34 are in contact with each other and the power tool 80 does not receive power. The transmitter 30 is preferably configured to be waterproof or water-resistant such that it can withstand adverse operating conditions while mounted to an operator's belt or clothing, such as in rain.

The receiver 10 and the transmitter 30 preferably each have status lights 12, 32 which are configured to indicate whether the receiver 10 and transmitter 30 are within close enough proximity to maintain communication. The status lights 12, 32 can be configured to only blink when the receiver 10 is in communication with the transmitter 30, to blink green when the receiver 10 and transmitter 30 are in communication and to blink red when the receiver 10 and transmitter 30 are not in communication, or in any other fashion to suitably distinguish between the in-communication and out-of-communication states of the receiver 10 and transmitter 30. The receiver 10, the transmitter 30, or both are also preferably configured to also have an audio alert system including speakers 15, 35 to indicate, in conjunction with the status lights 12, 32 when the receiver 10 and the transmitter 30 are or are not in communication. In another embodiment, the receiver 10, transmitter 30, or both may be configured to communicate with at least one external audio device, such as a walkie-talkie, to alert users when the receiver 10 and transmitter 30 are in communication.

Figure 4:
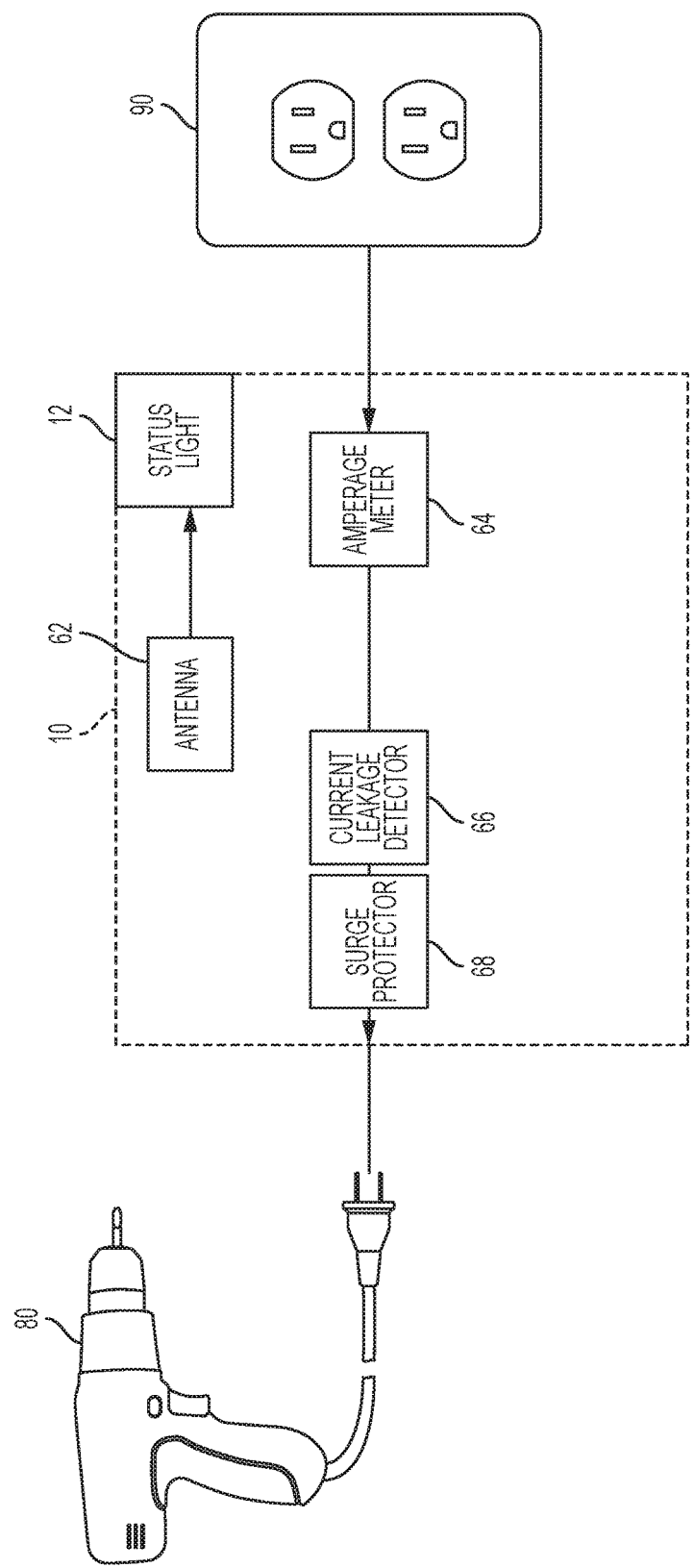
FIG. 4 is a schematic block diagram of the electrical components associated with the receiver of the safety cutoff device of FIG. 1.

Referring to FIG. 4, circuitry 60 of the receiver 10 is shown in schematic block diagram form. The circuitry 60 includes an antenna 62 to facilitate communication with the transmitter 30 and with the status light 12. The circuitry 60 preferably includes an amperage meter 64 capable of measuring the current received from the electrical outlet 90 or source of electrical power and drawn by the power tool 80. The amperage meter 64 is preferably configured to detect whether the power tool 80 or other device is drawing more current than would usually be required by the power tool 80, such as in the case of a short circuit. In such cases, the receiver 10 is preferably configured to cut off power to the power tool 80. The circuitry 60 also preferably includes a surge protector 68 capable of regulating the power provided to the power tool 80 should the circuitry 60 detect an unexpected voltage spike from the electrical outlet 90 or source of electrical power.

The circuitry 60 also preferably includes a current leakage detector 66 capable of detecting current leakage. In the event that the current leakage detector 66 detects current leaked to a ground that exceeds a predetermined amount, the current leakage detector 66 cuts off power to the power tool 80. This functionality aids in the desired goal of safety when using power tools or other devices by cutting off power and disabling the power tool 80 or other device in the event that power from the tool leaks from the power tool 80 to the operator, causing a potentially harmful electric shock to the operator. The current leakage detector 66 can be a common ground fault current interrupter, leakage current detector interrupter, equipment ground-fault protective device, appliance leakage current interrupter, immersion detection current interrupter, or any other type of current leakage detector 66 that can perform the described functionality and withstand the normal operating conditions of the receiver 10.

Figure 3:
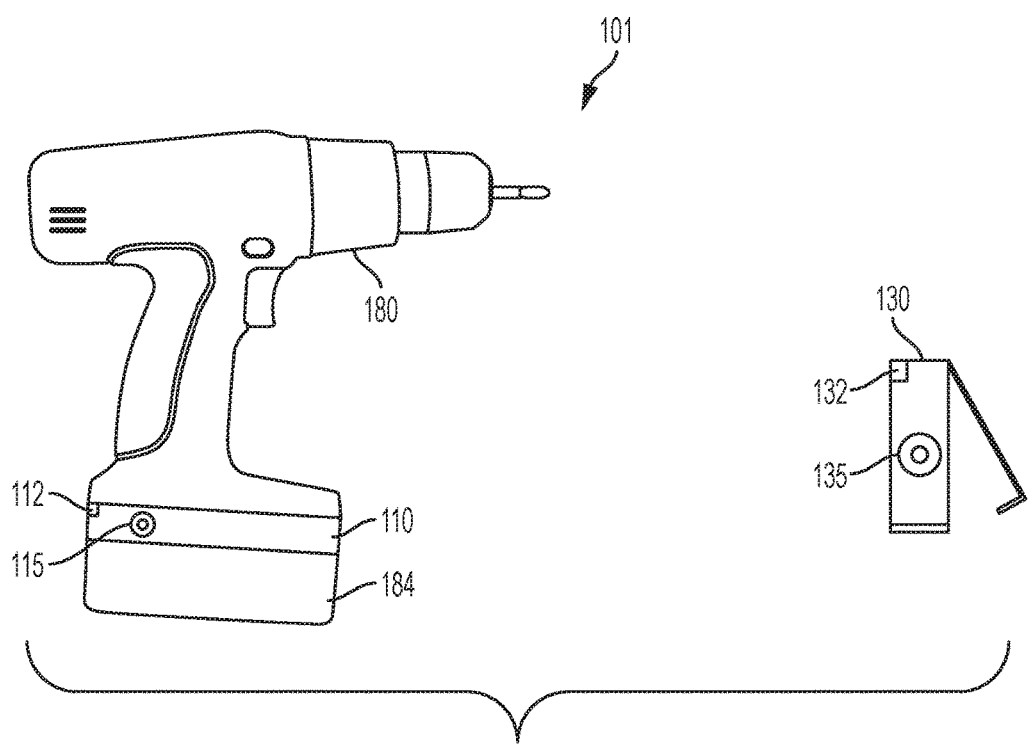
FIG. 3 is a front perspective view of a second embodiment of the safety cutoff device for a power tool, including a receiver, a power tool, a battery, and a transmitter.

Referring now to FIG. 3, a second preferred embodiment of a safety cutoff system 101 is shown. The second preferred embodiment preferably includes a receiver 110, and a transmitter 130. To demonstrate use of the cut off system 101, FIG. 3 also shows a power tool 180 and a battery 184. The second preferred embodiment is configured for use with a battery powered power tool 180, such as a drill. Power tools 180 are commonly available in a cordless configuration and powered by a rechargeable 12 Volt, 18 Volt, 20 Volt, or other voltage battery 184. Typically, the battery 184 is mounted directly to the power tool 180 and is easily removable by a user to recharge the battery 184 and optionally attach a different battery 184. In the second preferred embodiment of the cutoff system 101, the receiver 110 is configured to mount to the power tool 180 in place of the battery 184, while the opposing side of the receiver 110 is configured to receive the battery 184 and pass power through to the power tool 180. In use, the receiver 110 of the second preferred embodiment operates in the same fashion as the receiver 10 of the first preferred embodiment, in that it does not transmit power from the battery 184 to the power tool 180 unless the transmitter 130 is within a suitable distance to engage in communication. In an alternate embodiment (not shown), the receiver 110 may be built into the battery 184. The receiver 110 and transmitter 130 preferably include status lights 112, 132 and an audio alert system including speakers 115, 135 just as in the first preferred embodiment.

It will be appreciated that the cutoff system 1, 101 may be used with devices other than a power tool 80, 180 for performing the above described cutoff function and that the present invention is not limited to use with power tools. For example, and by no means limiting, the cutoff system 1, 101 may be used to cutoff power when the transmitter 30, 130 is not within range of a receiver 10, 110 mounted to an automobile, garbage disposal, space heater, air conditioner, electric stove, lawn mower, factory tools, industrial machines, surge protector, extension cord, power strip, wall outlet or receptacle, universal rechargeable battery, or any other device which utilizes electricity and for which there may be a desire to add an automatic cutoff function.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the present disclosure.

We claim:

1. A detachable adapter configured to automatically cut off power to an electrical power tool, to halt transmission of electrical current when current leakage is detected, and to halt transmission of electrical current when the current drawn by the electrical power tool exceeds the normal operating current of the power tool, the detachable adapter having a first location to selectively attach to the electrical power tool, a second location to selectively attach to a removable battery, and a status light configured to indicate whether a first communication signal broadcast by a transmitter is detected, the detachable adapter comprising:
   a receiver mounted within the adapter configured to: (i) receive the first communication signal; (ii) to command the detachable adapter to transmit electrical current from the battery to the electrical power tool when the receiver detects the first communication signal; and (iii) to interrupt electrical current from the battery to the electrical power tool when the receiver does not detect the first communication signal.

2. The detachable adapter of claim 1, wherein the adapter further comprises a speaker configured to indicate whether the first communication signal is detected.

3. The detachable adapter of claim 1, further comprising a communication device, wherein the adapter is configured to transmit a second communication signal to the communication device to indicate whether the first communication signal is detected.

4. The detachable adapter of claim 3, wherein the communication device is a smartphone.

5. A detachable adapter configured to automatically cut off power to an electrically operated device, to halt transmission of electrical current when current leakage is detected, and to halt transmission of electrical current when the current drawn by the electrically operated device exceeds the normal operating current of the power tool, the detachable adapter having a first location to selectively attach to the electrically operated device, a second location to selectively attach to a removable battery, and a status light configured to indicate whether a first communication signal broadcast by a transmitter is detected, the detachable adapter comprising:
   a receiver mounted within the adapter configured to: (i) receive the first communication signal; (ii) to command the detachable adapter to transmit electrical current from the battery to the electrically operated device when the receiver detects the first communication signal; and (iii) to interrupt electrical current from the battery to the electrically operated device when the receiver does not detect the first communication signal.

6. The detachable adapter of claim 5, wherein the adapter further comprises a speaker configured to indicate whether the first communication signal is detected.

7. The detachable adapter of claim 5, further comprising a communication device, wherein the adapter is configured to transmit a second communication signal to the communication device to indicate whether the first communication signal is detected.

8. The detachable adapter of claim 7, wherein the communication device is a smartphone.

* * * * *